United States Patent [19]

Priem et al.

[11] Patent Number: 5,619,658
[45] Date of Patent: Apr. 8, 1997

[54] METHOD AND APPARATUS FOR TRAPPING UNIMPLEMENTED OPERATIONS IN INPUT/OUTPUT DEVICES

[75] Inventors: Curtis Priem, Fremont; David S. H. Rosenthal, Palo Alto, both of Calif.

[73] Assignee: Nvidia Corporation, Sunnyvale, Calif.

[21] Appl. No.: 441,082

[22] Filed: May 15, 1995

[51] Int. Cl.⁶ .................................................. G06F 13/00
[52] U.S. Cl. .......................................... 395/280; 395/733
[58] Field of Search ..................................... 395/280, 733

[56] References Cited

U.S. PATENT DOCUMENTS

| | | | |
|---|---|---|---|
| 4,742,443 | 5/1988 | Rohn et al. | 364/136 |
| 4,991,083 | 2/1991 | Aoyama et al. | 364/200 |
| 5,230,070 | 7/1993 | Liu | 395/425 |
| 5,237,670 | 8/1993 | Wakerly | 395/425 |

*Primary Examiner*—Jack B. Harvey
*Assistant Examiner*—John Travis
*Attorney, Agent, or Firm*—Stephen L. King

[57] ABSTRACT

Apparatus and a method by which the flow of commands to an input/output device may be halted when the device is unable to respond to a command decoded to its address space. The apparatus includes circuitry for ascertaining whether the input/output device is able to respond to a command decoded by the decoding circuit, a circuit for storing the data and address of a command transferred to the input/output device to which the input/output device is unable to respond, and circuitry for generating a signal to disable immediately the flow of commands to the input/output device and an interrupt to assure that the unimplemented command is handled in an expeditious manner.

12 Claims, 6 Drawing Sheets

METHOD AND APPARATUS FOR TRAPPING UNIMPLEMENTED OPERATIONS IN INPUT/OUTPUT DEVICES

BACKGROUND OF THE INVENTION

1. Field of the Invention

This invention relates to computer circuitry and, more particularly, to apparatus and a method for trapping unimplemented operations in input/output devices which include first-in first-out (FIFO) buffers.

2. History of the Prior Art

Modern computer system are typically based on an architecture which was first offered in the Digital Equipment Corporation (DEC) PDP11 computer. One problem with this architecture as with earlier IBM and CDC mainframe architectures is that writing directly to the input/output devices of the system by an application program is prohibited. Although this architecture allows all of the facilities of the central processing unit to be used for input/output, it requires that the operating system running on the central processing unit attend to all of the input/output functions using trusted code. This significantly slows any input/output operation of the computer.

In contrast to earlier mainframe systems, in this architecture there is no process by which the input/output performance of the system can be increased except by increasing the speed of the central processing unit or the input/output bus. This is an especial problem for programs which make heavy use of input output/devices such as video and game programs which manipulate graphics and high quality sound extensively.

In a modern computer, the central processing unit and the input/output devices operate at different speeds. It can be very inefficient for a modern central processing unit to wait until an input/output write operation is complete before performing the next operation which often has nothing to do with input/output. On the other hand, a central processing unit has to wait for the result of a read operation because it needs the result produced.

Since most central processing unit accesses to input/output devices are write operations, the designers of systems and input/output devices attempt to decouple the central processing unit and input/output devices as far as write operations are concerned by implementing write queues using first-in first-out (FIFO) write buffers. These buffers may appear at various places in a particular implementation: as a part of the central processing unit, as part of a bridge chip, or as part of an input/output device.

A new input/output architecture has now been invented which overcomes the problems of the prior art PDP11 architecture and allows application programs to write directly to input/output devices. This architecture uses FIFO buffers at the input of an input/output control unit to allow the central processing unit and the input/output devices to be decoupled in order to increase the speed of operation. One problem raised in this new architecture is that an input/output device and the buffers supplying it must accept all information written to them over the input/output bus in order to implement the architecture. Individual input/output devices may not implement many of the commands in hardware. Some of the operations commanded may be implemented in software while other of these operations commanded may have been generated in error.

It is desirable to provide a means for handing unimplemented operations in input/output devices which include first-in first-out (FIFO) buffers.

SUMMARY OF THE INVENTION

It is, therefore, an object of the present invention to provide apparatus and a method for trapping unimplemented operations in input/output devices which include FIFO buffers.

These and other objects of the present invention are realized by an apparatus and a method by which the flow of commands to an input/output device may be halted when the device is unable to respond to a command decoded to its address space. The apparatus includes circuitry for ascertaining whether the input/output device is able to respond to a command decoded by a decoding circuit, a circuit for storing the data and address of a command transferred to the input/output device to which the input/output device is unable to respond, and circuitry for generating a signal to disable immediately the flow of commands to the input/output device and an interrupt to assure that the unimplemented command is handled in an expeditious manner.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
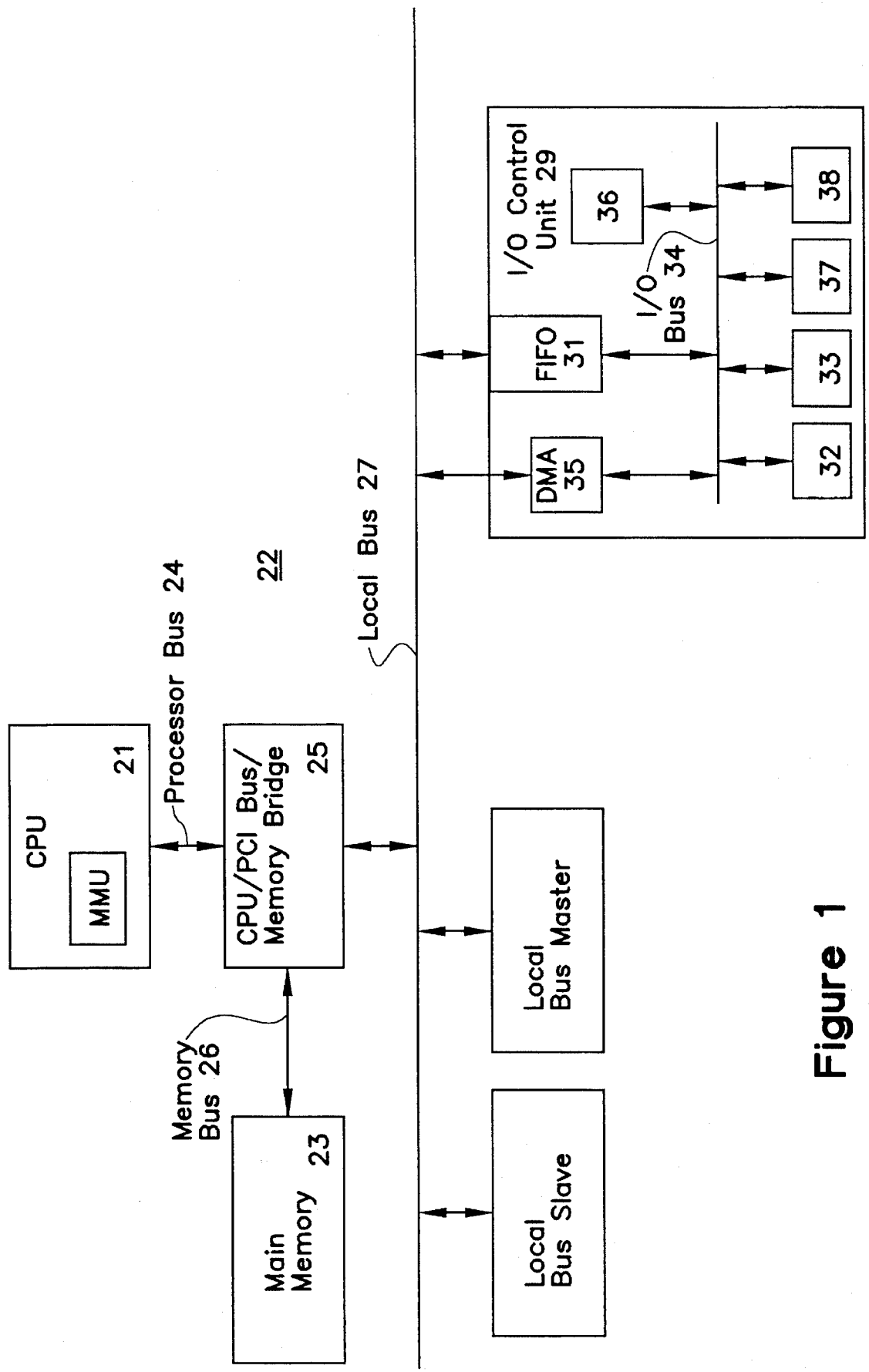
FIG. 1 is a block diagram of a computer system which may utilize the present invention.

FIG. 1 is a block diagram of a computer system 22 which has been devised to overcome the problems of the prior art. The system 22 provides a new input/output architecture which cooperates with other components of present systems based on the PDP11 architecture, yet is able to drastically increase the speed of input/output operations for new application programs. In order to accomplish this, the new architecture of the system allows write operations by application programs to be made directly to the input/output devices. This eliminates the cumbersome multi-step software processes invoked by prior art systems using the operating system and trusted code for every input/output access.

In order to accomplish the process safely, the input/output architecture of the system 22 utilizes an input/output control unit 29 which provides its own virtual name-to-physical-device and context translation for all of the input/output devices associated with the new control unit 29 on its own device bus 34. By enforcing this translation, application programs can write directly to input/output devices without affecting assets of other application programs. Once this translation from virtual names furnished by the application programs to addresses of physical input/output devices on the device bus is accomplished and context has been furnished to the input/output devices, translation of addresses of input/output devices on the input/output bus into physical addresses on the device bus 34 is accomplished directly by hardware at the input/output control unit 29. This hardware also checks permissions; and, when an operation is known to be safe, it is performed by hardware. When a translation operation fails, the operating system software is invoked.

The architecture of the system 22 has been designed so that it eliminates almost all read operations of input/output devices by the central processing unit. In order to accomplish this, the input/output control unit 29 includes a first-in first-out (FIFO) unit 31 for storing write operations directed to the input/output control unit. The FIFO unit 31 queues incoming write operations. Unlike FIFO units in prior art systems, it stores both the address and data of each command. This allows the write operations to the input/output control unit 29 to occur asynchronously so that both the central processing unit 21 and the input/output control unit 29 may be functioning independently of one another and neither need wait for operations of the other.

To help maintain this asynchronous operating arrangement and to eliminate read operations to the extent possible, the input/output control unit also includes an advanced direct memory access (DMA) device 35 which provides direct memory access for operations conducted involving input/output devices. The DMA device 35 allows the results of input/output operations to be written from input/output devices to main memory 23 rather than requiring read operations by the central processing unit 21 to obtain these results.

Although the input/output architecture of system 22 may be used with systems utilizing a single input/output bus for all operations, the preferred embodiment of system 22 functions as well in a system utilizing a local bus 27 such as the Peripheral Component Interconnect (PCI) bus or the Video Electronics Standards Association (VESA) local bus which may be associated with other input/output buses. While the discussion of this specification will assume that bus 27 is a local bus, the local bus 27 is also referred to in this specification as the input/output bus 27. In arrangements utilizing local buses, the central processing unit 21 and main memory 23 are typically arranged on a processor bus 24 and a memory bus 26, respectively, and are joined to a bridge unit 25. The central processing unit 21 typically includes a memory management unit. The bridge unit 25 provides write buffering for operations between the central processing unit 21 and the input/output bus 27, between the central processing unit 21 and main memory 23 on the processor bus 24 and the memory bus 26, and between the input/output bus 27 and main memory 23.

Figure 2:
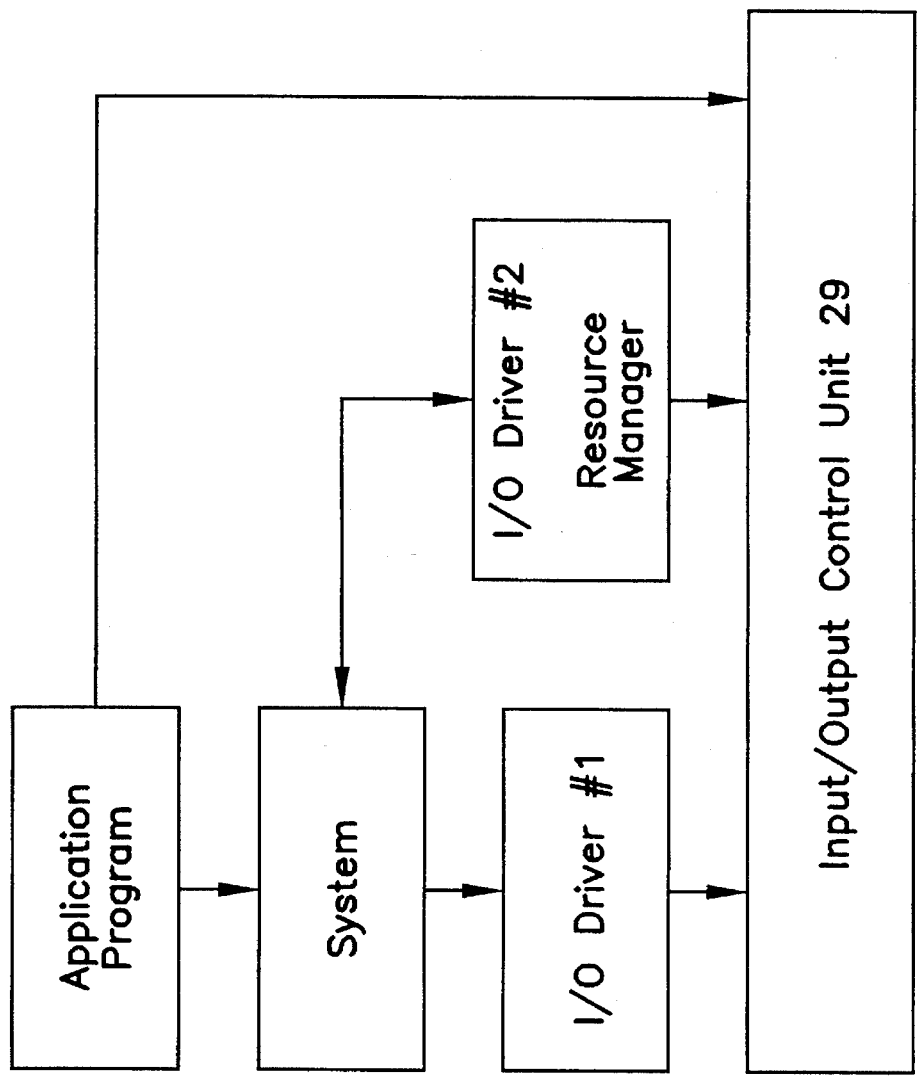
FIG. 2 in a diagram illustrating the operation of software in the architecture of the present invention.

The general operation of the input/output unit 29: FIG. 2 illustrates the manner in which operations are conducted by software in the new architecture. An application program which utilizes the new architecture may issue a command requesting permission from the operating system to map certain of the physical addresses decoded by the input/output control unit 29 into the address space of the application program. The operating system, using a new I/O driver #1, allots some portion of the system physical addresses which the input/output control unit 29 is decoding to the particular application program address space for its use only and installs the virtual-to-physical input/output bus address translations for the application program in the memory management unit. In a typical computer system, the memory management unit stores translations for what are referred to as pages of memory. If the size of the portion of system physical addresses allotted to an application program is a multiple of the memory management unit page size, then the I/O driver #1 can use the memory management unit to ensure that no more than one application program may access each area.

Installing the appropriate translations in the memory management unit of the central processing unit 21 creates a path around the operating system by which the application program may directly read from and write to the hardware of the input/output control unit 29. The application program then writes to these allotted input/output bus addresses providing as data a virtual name of its choice for an input/output device on the device bus 34. The input/output control unit 29 takes the input/output address and the virtual name and uses it to install a translation from input/output bus addresses to device bus addresses in its internal hardware and to place the context required by the application program in that input/output device. Once this has occurred and for so long as the application program continues to run, the application program writes commands which the memory management unit associated with the central processing unit translates to the physical addresses on the input/output bus 27 for the input/output control unit 29; and the input/output control unit 29 further translates the input/output bus addresses of the commands to physical addresses of input/ output devices on the device bus 34. In this way, the application may write directly to the input/output unit in order to utilize an input/output device such as the graphics output controller 33 without requiring any software intervention by the operating system. As will be understood from the more detailed description which follows, the use of many identically-sized input/output device address spaces each assigned for use only by one application program allows the input/output addresses to be utilized to determine which application program has initiated any particular input/output write operation.

Area addresses: When an application program desires to write to an input/output device on the device bus 34, it addresses that device using an address for the address space assigned by the driver #1. Decoding circuitry decodes the address by reviewing a number of the highest order bits decoded by the chip sufficient to indicate a unique portion of the input/output address space assigned to an application program and places the command in the FIFO buffer 31. The FIFO buffer 31 handles at one time commands from only the application program to which the address area has been mapped.

The unit 29 receives physical addresses furnished by the memory management unit and virtual names furnished by application programs for operations to be performed which have been sent to the FIFO unit 31 and controls the translation of those virtual names for all input/output devices. The hardware unit 29 includes the device bus 34 to which the individual input/output devices such as a disk controller 32, a graphics output controller 33, and a sound generator 37 are shown joined. The unit 29 also includes a DMA unit 35 which is adapted to transfer data between the individual input/output devices and main memory for use by the central processing unit or other components of the system.

Database of safe translations for input/output devices: A second system driver called a "resource manager" maintains a database of data structures which include safe translations for input/output operations utilizing the physical input/output devices associated with the input/output control unit 29. A safe translation for an application to utilize an input/output device requires a correct physical address for the device and correct context for the device to function appropriately with the application program. These data structures include the physical address on the device bus 34 of the hardware which provides the input/output function and any context required by the hardware for operation with the application program.

When the application program wants to utilize an input/output device, the application program writes the virtual name chosen with a special calling command which calls an object representing the input/output device. The resource manager looks up the named data structure including (for a physical device) the safe translation and finds the context and physical address on the device bus 34 for the particular input/output device described by the name. The resource manager places the safe translation including the physical address and context in hardware to provide a translation from the input/output bus addresses. The resource manager causes any changes necessary to be made to the context on the input/output device which has been called. Thus, when later commands are sent to the same input/output device from the application program, they are routed by hardware to the particular addressed input/output device on the device bus 34.

Unsafe operations: In any case in which the input/output device to which the operation is directed is unknown to the control unit 29, the unit 29 calls the resource manager which runs on the central processing unit and functions as a portion of the operating system. The resource manager determines how the operation is to be handled. The operation may be a write by a new application program requiring various set up operations before it may proceed. If an operation requires context changes at the input/output device, this is handled by the resource manager. If an operation requires a procedure which is not yet in order under the operating system such as requiring data from memory which is not in memory at that time, the resource manager transfers the command to the operating system to perform the necessary memory transfers (or the like) which allow the commanded operation to proceed. Alternatively, the operation may be directed to a device which is not otherwise associated with the control unit 29 such as a LAN interface or other bus master or slave on the input/output bus 27 which is not manufactured to cooperate with the unit 29. If such a device is addressed, the command is directed to the operating system by the resource manager and handled by the operating system in the normal manner for input/output devices of the prior art.

Address translations in hardware: When the operation involves a device directly associated with the control unit 29 on its device bus 34, the commands are sent by hardware directly to that device for execution. If the command requires that data be transferred to or from the application, the input/output device performs the transfer using the DMA unit 35. Upon the return of data in response to a command, the DMA unit 35 of the control unit 29 responds by transferring the data to main memory and notifying the central processing unit in a separate DMA operation of the existence of the data so that no local bus read operation by the central processing unit 21 is necessary to ascertain the result of the operation or to receive the data provided.

Commands not implemented in hardware: It will be seen that the new input/output architecture includes a number of unique features which allow it to accomplish its purposes. In order to allow application programs to write directly to input/output devices, the architecture provides for two stages of decoding. An application writes commands each including both data and address to the input/output control unit which decodes a very wide range of addresses. The input/output control unit provides a second stage of decoding in which safe translations are provided to uniquely-addressed but identically sized address sub-areas for each of the individual input/output devices which may be utilized.

Since each of these sub-areas of address space has an identical number of addresses, some input/output devices will have available more addresses than can be implemented practically. Thus, some addresses for which translations are provided to an input/output device will not be implemented. Other addresses may not be implemented by particular input/output devices in hardware but may be implemented by the resource manager in software. If a command which cannot be executed is decoded to a input/output device which accepts commands over a range of addresses, then the flow of commands to the input/output device must be halted or data will be lost. In prior art systems, this requires that the input/output device generate an interrupt, acquire the bus to notify the processor, clear all write queues in the bus pipeline, and then stop the transfer of data. In the present architecture, commands are transferred from the FIFO unit so by the time the processor is stopped, a significant number of commands will have been lost by overwriting registers in the input/output device. Since some of these commands should be carried out in software by the resource manager and others sent to the operating system, a new method for dealing with unimplemented commands is desirable.

Figure 3:
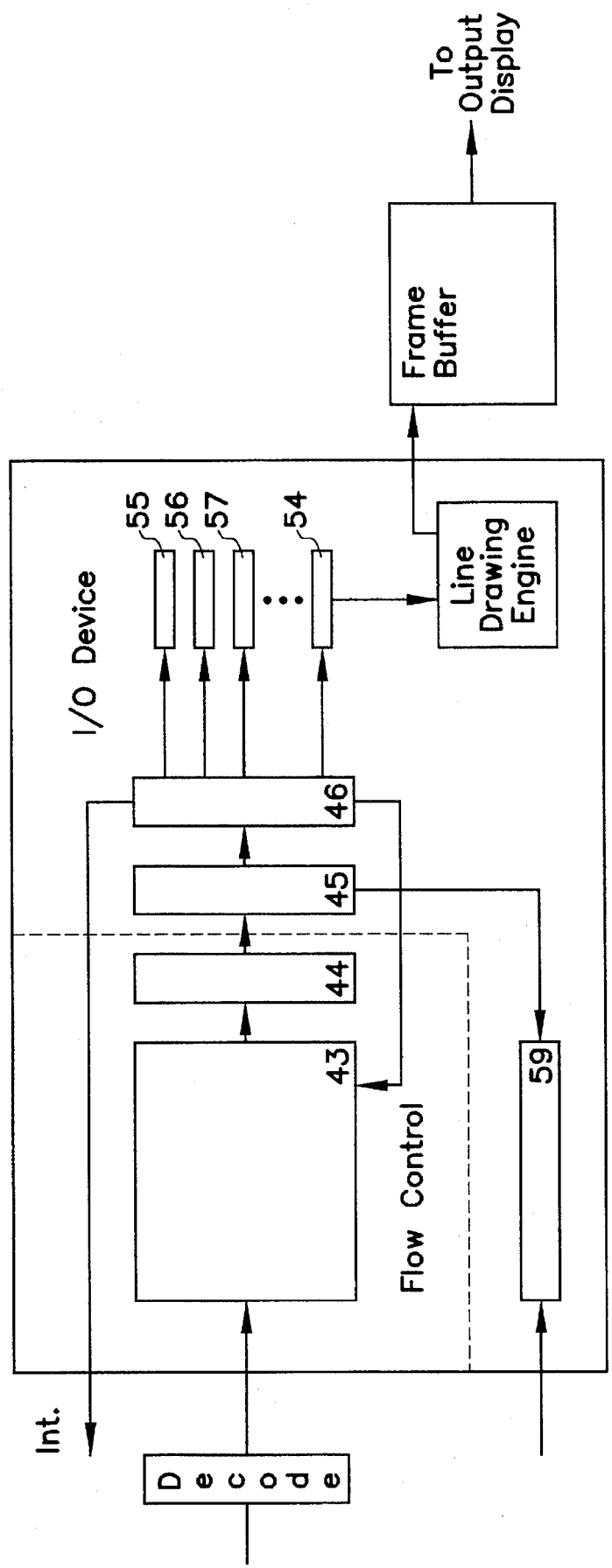
FIG. 3 is a block diagram of a particular input/output device which may utilize the present invention to achieve flow control for unimplemented commands in a computer system.

In order to prevent this loss of data and to allow commands to be implemented in software by the resource manager or by operating system software, an arrangement such as is illustrated in general in FIG. 3 may be utilized. In this arrangement, a first flow control circuit 43 is provided. The circuit 43 may be a first-in first-out (FIFO) circuit or similar circuitry having some means of flow control to stop the flow of commands during a period in which an interrupt is being generated and transferred to the central processing unit. In the preferred embodiment, the circuit 43 is implemented by the FIFO unit 31 of FIG. 1 and a register 39 (see FIG. 6) which is read by the central processing unit during operation to determine the number of additional commands which the FIFO unit 31 is capable of holding at any time. The central processing unit must test the register before sending any commands and is typically allowed to send no more than the number held by the register 39 so that the FIFO unit 31 cannot overflow.

The circuit 43 receives the commands (data and address) which are decoded from the system input/output bus and transfers them to an internal decoder circuit 44 which decodes a range of sequential addresses in the manner of the second stage decoder/address-translator in the input/output control unit 29 described above. The decoder 44 transfers all addresses within the sequential range to a FIFO circuit 45. The FIFO circuit 45 may be a one-stage FIFO buffer which is a part of the circuitry of an individual input/output device. The FIFO circuit 45 furnishes all of the commands it receives to a third decoder circuit 46. The third decoder circuit 46 may decode a range of addresses within the larger range decoded by the decoder circuit 44 for a register 54 (and for additional registers 55–58). The decoder 46 may also decode a single address for any of the registers 55–58. However, the decoder 46 decodes all of the addresses for functions which the associated input/output device can actually carry out. As may be seen, the decoder 46 and the registers 54–58 may be a part of the circuitry of a particular input/output device.

If there are any addresses decoded by the decoder 44 which cannot be carried out by the input/output device or other circuit addressed, then these addresses are not decoded by the decoder 46 but are transferred to storage circuit 59. The storage circuit 59 is adapted to store both the address and the data of the command. A failure to translate also causes the decoder 46 to generate an interrupt which is sent in the normal manner to the central processing unit on the bus and a signal which is transferred to the flow control circuit 43 to halt the transfer of data to the input/output device. This signal causes the commands in the flow control circuit 43 to be stopped during the period in which the processor is attending to the interrupt. The commands still being transferred from the central processing unit to the flow control circuit 43 will cease to flow when the value in the register 39 goes to zero indicating to the central processing unit that no further room remains for commands.

When the interrupt is received by the central processing unit, the central processing unit responding to operating system interrupt routines may read the command in the register and cause the resource manager to respond to that command in an appropriate manner. This allows the resource manager to carry out any necessary commands in software or to transfer the commands to the operating system. In the interim, the commands to the input/output device remain in the flow control circuit 40 ready to be executed as soon as the interrupt has been processed. In this manner, the command data is not lost even though the input/output device is unable to process any particular command transferred to it during burst or other mode of operation.

Figure 6:
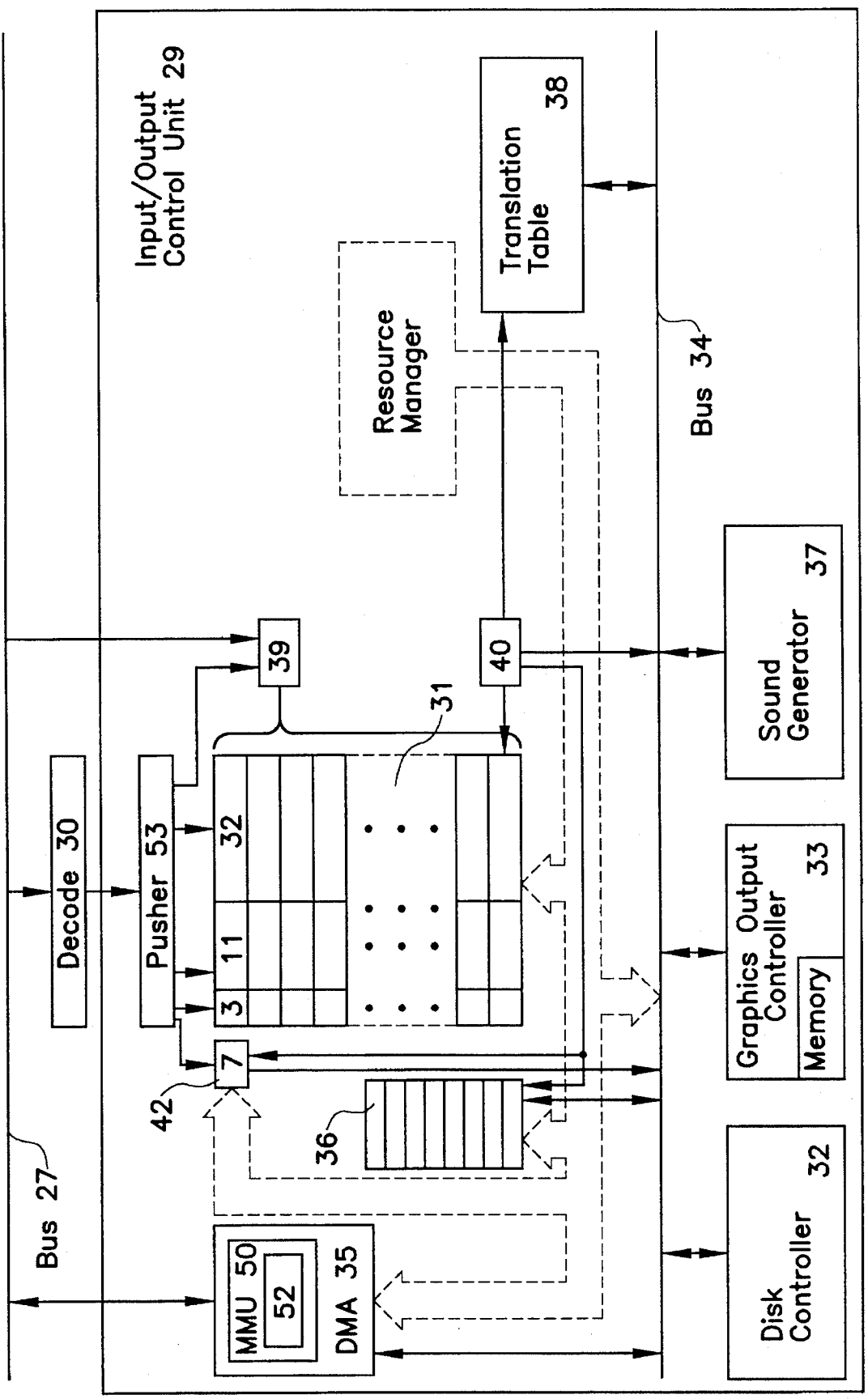
FIG. 6 is a block diagram of a specific embodiment of input/output circuitry used in a personal computer in accordance with the present invention.

Specific details of the new architecture: FIG. 6 is a block diagram illustrating details of the input/output control unit 29 including the device bus 34 and the input/output devices arranged on that bus. As described above, the input/output control unit 29 includes a decode unit 30 which receives commands directly from the input/output bus 27 and transfers the commands to a pusher circuit 53 which transfers the commands to the FIFO unit 31. The FIFO unit 31 stores the data along with the addresses for each of the commands being transferred to all of the input/output devices associated with the input/output control unit 29. In one embodiment, the FIFO buffer 31 includes thirty-two stages. The thirty-two stages allow the FIFO buffer to hold thirty-two individual serially ordered commands at any time.

Figure 4:
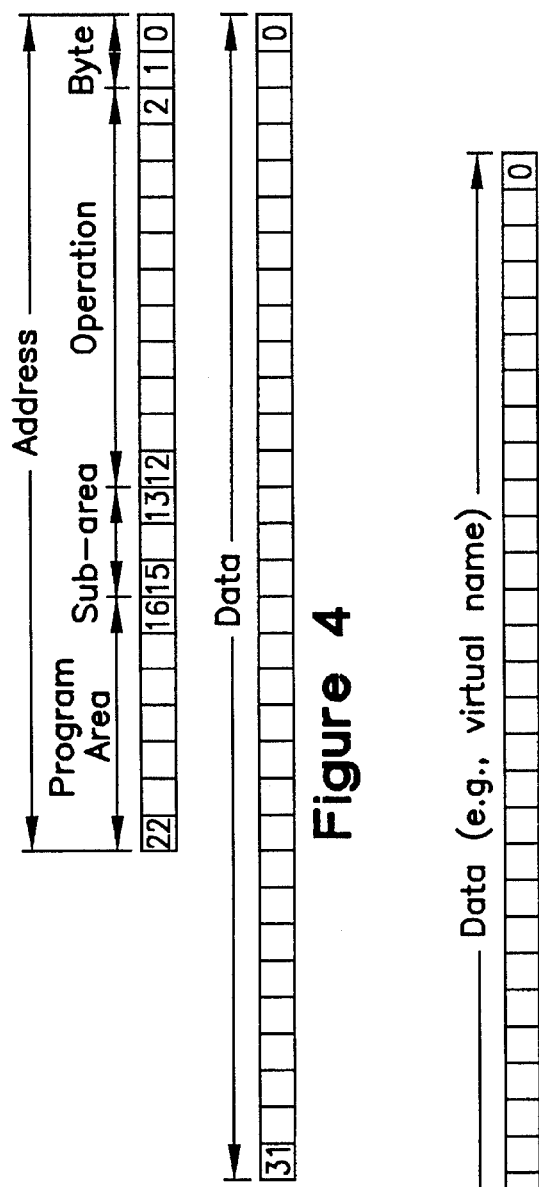
FIG. 4 illustrates the address and data bits utilized in one embodiment of the invention.

Addresses: In one embodiment, the entries in the FIFO buffer 31 include thirty-two bits of data space and sixteen bits of the twenty-three bits of address space decoded by the input/output control unit 29. The remaining upper seven bits of the address which represent the 128 distinct areas of the address space which are available and thus define the particular application program are held in a register 42. The address and data space of the total command space (including that in the FIFO unit and the seven highest order bits defining the area assigned to the application program by the operating system) are pictured in FIG. 4. The twenty-three bits of address space are sufficient to map eight megabytes of address space on the input/output control unit 29. The eight megabytes of address space is divided into the 128 individual areas each having 64 Kbytes which may be allotted by the operating system to an application program.

When a first command from an application program is transferred to the input/output control unit 29, decoding circuitry sends the command to an input stage of the FIFO buffer 31 and the upper seven bits of the twenty-three address bits representing the area designated for that program are transferred to of the register 42.

Each of the 128 addressable areas is subdivided into eight separate sub-areas each having eight Kbytes of address space. The next lower three bits of the address space represent these eight sub-areas. The application treats each of these eight sub-areas identically, designating at various times various objects representing particular input/output devices and their context, as being accessed through each sub-area. As will be seen, each of these sub-area addresses represents one of eight registers which may store the physical address of an input/output device on the bus 34. The two lowest order bits of the address space represent byte positions in a command. In the preferred embodiment, the data is word aligned; and these bits are not included in the FIFO buffer 31. Consequently, eleven bits are left to represent a particular operation using the particular input/output device designated by the sub-area. With eleven bits of address space, 2048 individual operations (or portions thereof) are available for devices using addresses in each sub-area. In one embodiment, data structures (objects) are created in an object oriented programming language to represent the devices and their contexts which may be addressed in the sub-areas. The operations of the devices are then encoded as methods on each of these objects. This encoding of a sub-area as an object of a particular class is dynamic, and a new object representing a new device and its context may be encoded in the sub-area by an application program writing to offset zero, a special calling command which calls an address translation for a new device to the sub-area holding the address translation of an old object.

As pointed out above, when a program which is able to utilize the input/output system first requests that the operating system map a portion of the addresses decoded by the input/output control unit 29 to its address space, the operating system assigns physical addresses designating one of the 128 areas available for the input/output control unit 29 to the application. Since the I/O driver #1 is constructed never to map more than one application program to an area, the seven bits also identify the application program.

When an application program writes to the FIFO unit 31, the seven upper bits of the address are used to determine the sixty-four Kbyte area which it has been allotted by the operating system to that application. The three bit sub-area designation is used to select one of the eight Kbyte sub-areas which the application may allot to a device. The eleven bit offset is used to determine the method or operation to be carried out by the device, and the thirty-two bit data space is used for the data related to the commanded operation. In a typical write operation, the write to any particular eleven bit offset invokes a particular method (operation to be performed indicated by the eleven bits) on the object (the input/output asset designated by the present name for the sub-area). However, these bits are also interpreted to provide direct translations from virtual names to physical addresses of input/output devices on the device bus 34 and to call the resource manager to perform various software operations.

Figure 7:
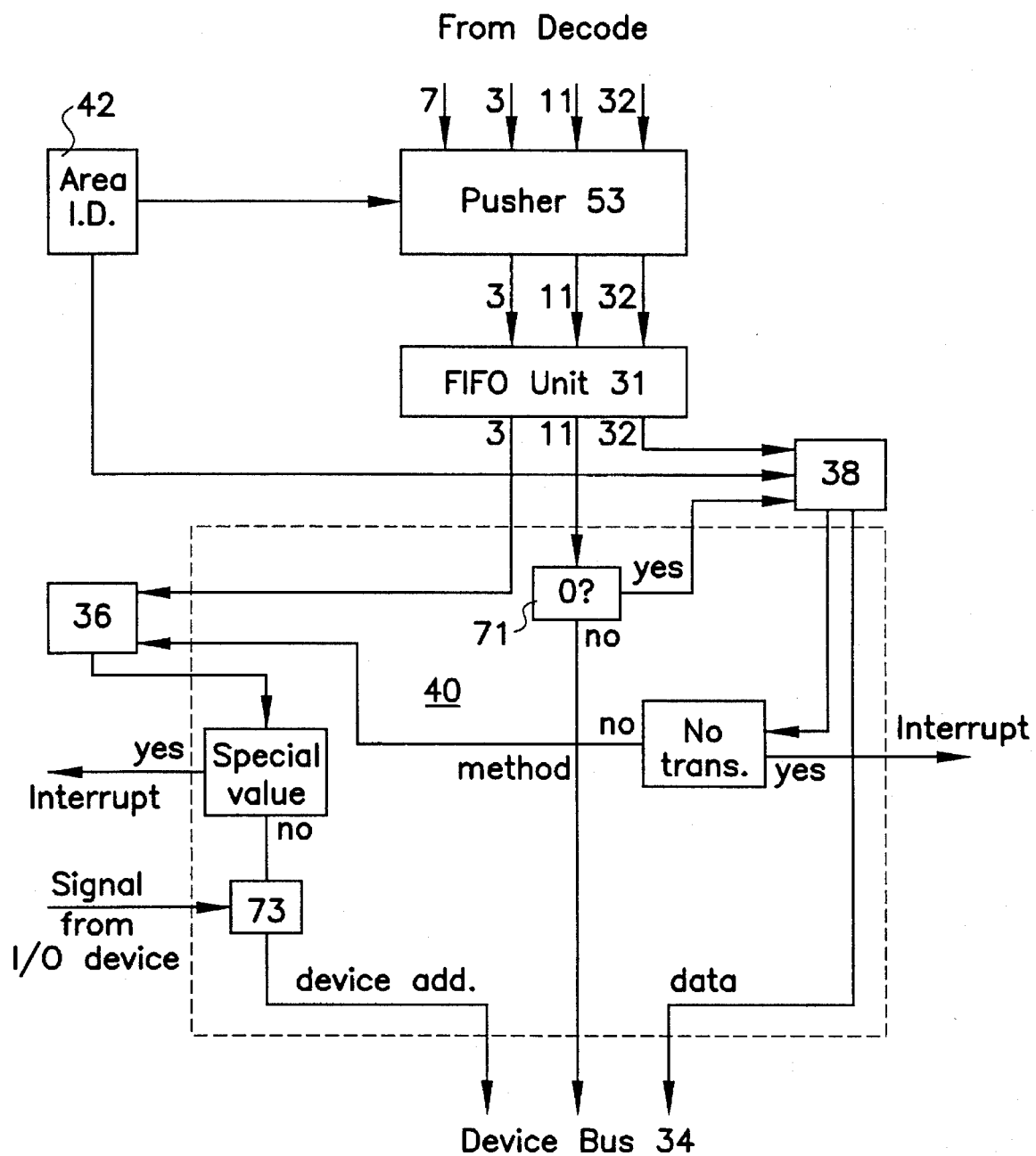
FIG. 7 is a block diagram illustrating in more detail specific portions of the circuitry shown in FIG. 6.

The puller circuit, current address registers, and translation table: These operations are accomplished by various circuitry and the resource manager, particularly by a puller circuit 40, a current physical address table 36 which includes space for eight address translations for devices presently in use, and a translation table 38 which may include a much larger number of safe address translations. In order to correctly direct the address and data provided in each command to an input/output device, the FIFO buffer 31 includes a circuit 40 called a puller which reviews the command about to be executed. The puller circuit is illustrated in more detail in FIG. 7. The puller circuit 40 looks at the address of the bottom command in the FIFO buffer 31. The puller circuit 40 uses the three sub-area bits of the address to determine which of the eight sub-areas (current address registers) of the table 36 is to be searched for an address translation or is to receive the result of a lookup in the translation table 38.

Writes to zero offset. The puller circuit 40 also includes logic 71 which then determines whether the next eleven method bits of the address are all zero. If the eleven method bits are all zero, this indicates a write to the zero offset which is the special calling method used for indicating that an application wants a new translation for an input/output device; and the puller circuit 40 sends the data to the translation table 38 along with the upper seven bits from the address indicating the area and performs a lookup. When the write is to this special calling method (zero offset), the data is the virtual name of a device. The result of the lookup is usually a safe translation which includes an address on the device bus 34 and an instance number defining context for an input/output device which are placed in a register of the table 36. When the physical address and instance number are placed in the register of the table 36, the puller circuit sends the seven bits indicating the area and the instance number to the input/output device to change the context on the device. This is the manner in which translations are made available for immediate use.

If the translation for the physical object does not exist in the translation table 38 of the input/output control unit 29, however, the input/output control unit returns a miss. This transfers the operation to the resource manager. The resource manager places a special value (all zeros in one embodiment) in the appropriate register of the table 36 and uses the command at the bottom of the FIFO buffer to perform whatever software operation is required by the command.

Writes to non-zero offset: If the offset is not zero, the puller circuit 40 takes the three bits indicating the sub-area and indexes into the table 36 to the proper register to find the device bus physical address. The puller circuit 40 concatenates that address with the eleven bit offset designating the method and writes the method and thirty-two bits of data to that physical address on the bus 34. A circuit 73 disables the transfer of the device address so that no command is sent if a signal indicates the input/output device is not ready because it does not implement the command. Moreover, if the value read from the sub-area of the table 36 is a special value which indicates a failed translation, this value generates an interrupt which calls the resource manager. The resource manager then uses the command at the bottom of the FIFO unit 31 to perform whatever software operation is required by the command. This helps assure that unsafe operations are handled by the operating system. It also allows the resource manager to be used to carry out in software various operations which are not implemented by a particular input/output device.

Figure 5:
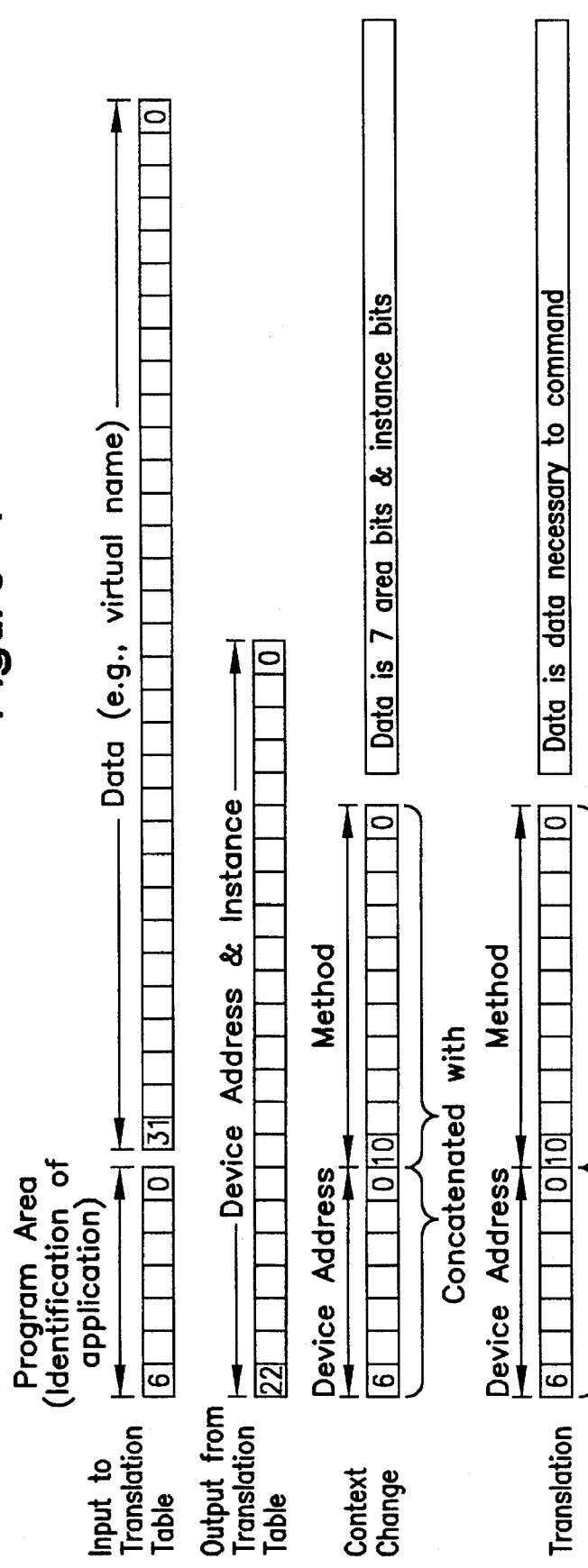
FIG. 5 is an illustration of entries in a translation table used in accordance with the invention.

FIG. 5 illustrates in the first two lines one entry in the translation table 38 utilized in one embodiment of the present invention. As may be seen, the seven bits of the address designating the area assigned to an application program and the thirty-two bit virtual name translate into twenty-three bits, seven of which indicate the address of the physical device on the device bus and sixteen of which indicate the instance of the data structure which provides the context to be placed on the input/output device. Each of the last two lines of FIG. 5 indicates one way in which the bits obtained in the translation are used. The eleven bits indicating the method invoked are concatenated with the physical address for the device retrieved from the translation table 38, and the concatenated value is placed on the bus 34 with data. Each of the input/output devices decodes addresses on the bus 34 to determine if it is the addressed device and responds accordingly to the operation indicated by the method.

Placing a translation in the table 38: When an application program first writes to the area which it has been allotted by the operating system and indicates that it desires to use an input/output device, the command is ultimately reviewed by the associated puller circuit 40. The puller circuit will find that the application program has selected one of the sub-areas using the three bit sub-area designation, selected an offset zero using the eleven bits, and has written a name for a particular input/output device in the thirty-two bit data space. When a zero value is written as the eleven bit offset to any one of the sub-areas, this instructs the input/output control unit 29 to make available that one of the sub-areas to the newly-named object and to interpret eleven bit offsets within the sub-area as the various methods which are available to an object of that class.

When the application program writes the name of an object as data to offset zero of a sub-area, the puller circuit 40 takes the virtual name, adds the seven bits designating the area, and looks up the concatenated value in the translation table 38 to obtain the physical address on the device bus 34 and the instance number of the physical device which is responsible for the operation represented by the particular object being named. If a translation is in the table 38 and the object represents a line drawing device, the physical address on the bus 34 of the line drawing hardware in the graphics rendering engine should be returned. When the physical address is returned, it is placed in one of eight positions (registers) of the current physical address table 36 designating the sub-area to which the zero offset was written. If the translation for the physical object does not exist in the translation table 38 of the input/output control unit 29, however, the input/output control unit returns a miss. This transfers the operation to the resource manager. The resource manager places a special value (all zeros in one embodiment) in the appropriate register of the table 36 and uses the command at the bottom of the FIFO buffer to perform whatever software operation is required by the command.

On a first write to the input/output device by an application program, there will be no translations for that object name in the translation table; and the operation will be transferred to the resource manager. The resource manager in the preferred embodiment of the invention has access to the database which includes the data structures for objects which include the safe translations to the physical addresses of the input/output devices. These objects may represent hardware or software which implements various portions of the input/output operations.

The resource manager reviews the details of the command being written and determines that is a write to a zero offset. The resource manager uses the seven bits designating the area allotted to the application program and the thirty-two data bits providing the virtual name given by the application to find objects in its database. When it determines that this is a name for one of the named objects associated with the input/output control unit 29, the resource manager looks up the data structure for that object and makes that object immediately available. To make the object immediately available, the resource manager allots the sub-area to the predefined object and also places a translation in the table 38. If the object is a software object, the resource manager also places a special code in the table 36 to indicate that the object is a software object and the resource manager is to be called when the object is addressed.

Finally, the resource manager restarts the write operation. The lookup in the translation table 38 then succeeds. This causes the physical address and instance value to be placed in the register of the table 36 and the puller 40 to send the seven area bits and instance value to the input/output device to change the device context.

When the physical address on the device bus 34 and the instance value of the device corresponding to the current object are first placed in a register of the current address table 36, the address is used by the puller to send the instance value and the seven bits indicating the application program (and the address area) to the device on the device bus 34 (see line three of FIG. 5). The device compares the seven bits and the instance value to the area and instance it is presently utilizing. If they differ, the device changes its context or interrupts the resource manager to change its context so that the device is properly initialized for the application program.

When an application program writes the virtual name of an object to offset zero in one of the sub-areas, and when the lookup in table 38 of that virtual name succeeds, the physical address of the corresponding device on the device bus 34 and the instance value are also stored in a slot of the eight entry current physical address table 36 which slot corresponds to the sub-area to which the virtual name was written. The table 36 stores the physical address on the device bus 34 of the device corresponding to the current object accessible in that sub-area, if there is such a device. If there is not a physical device or there is no translation in the table 38, the entry stores the special value which has no translation and therefore causes the input/output control unit 29 to interrupt into the resource manager.

Writing directly to input/output devices: After the physical address on the device bus 34 of the device corresponding to the current object has been placed in the current address table 36, when a next write occurs to that object as indicated by the three bits of the address selecting the particular sub-area, the offset address will typically be other than zero. This offset will indicate the method invoked on the object. This offset (indicated by the eleven bits) is concatenated with the physical address held in the table 36 (see line 4 of FIG. 5) and broadcast on the device bus 34 to select the particular input/output device and the operation indicated by the method which is to be performed by that device. All of the devices on the device bus 34 listen on the bus and decode commands addressed to them.

Current address registers and sub-areas: Since eight sub-areas are available at once through the current address table 36, an application program may write up to eight virtual names for devices the application desires to utilize in input/output operations and have physical addresses for those devices immediately available by simply writing the virtual name to the zero offset of a sub-area. Thus, up to eight objects (devices) may have address translations immediately available in the table 36 for the application program using the FIFO unit 31.

The eight sub-areas available provide a large number of output options for an application program. The availability of eight sub-areas allows the application to accomplish a number of functions without the necessity of a translation table lookup and thus speeds input/output operations. However, since any application program may need to have access to all of the input/output assets which are available, the system provides a rapid manner of providing assets in addition to the eight devices which are represented by objects which fill the eight sub-areas allotted to that application program. When all of the eight sub-areas have been used by an application program so that input/output-to-device bus physical address translations for a device exist in each of the eight spaces in the table 36 and the application program running desires to write to a different input/output device, the application program may select a new device which it desires to use and place its address translation in the table 36 in place of any address translation presently occupying one of the registers. To accomplish this, the application program writes a new virtual name of a device as data directed to the zero offset of any of the eight sub-areas. This causes the input/output control unit 29 to replace the object presently occupying the sub-area with a new object representing the device indicated by the newly presented virtual name.

This is accomplished by the puller circuit 40 initiating a lookup in the translation table 38 and a replacement of the physical address in the table 36 designating the object in the sub-area with the physical address of the new device if a translation for the new object for the physical device has already been placed in the translation table 38 by the resource manager. Whenever an application program places a different translation in a register of the table 36, the change of address causes the puller to send the area bits and the instance value to the input/output device to change any required context.

Whenever any object is named for which the physical address is not in the physical address table 36 but for which a translation is available in the translation table 38, the lookup of that virtual name succeeds, the physical address and instance number of the corresponding device on the device bus 34 is stored in a slot of the current physical address table which corresponds to the sub-area to which the virtual name was written. Thereafter, writing to an offset to this sub-area will indicate a method invoked on the new object in the sub-area. This method (indicated by the eleven bits) is concatenated with the physical address held in the table 36 and broadcast on the device bus 34 to select the particular input/output device and the operation (indicated by the method) which is to be performed by that device. In this manner, the tables 36 and 38 act as a two level cache for object name translations which the application utilizing the FIFO unit 31 may immediately access and makes an extraordinarily large number of operations available even though the physical address space allotted to the program is limited.

Unimplemented commands: Although 2048 operations are available for each object which is physically on the device bus 34, it is probable that some number of the operations (methods) will not be implemented in hardware. The input/output device detects whether an operation is implemented in hardware by an internal decoder which decodes only those addresses which are actually implemented. A write to an address which is not implemented is stored (both address and data) in a register 59 on the input/output device (see FIG. 3). When an input/output device receives a command including a method it cannot carry out, the device also generates an interrupt indicating that the hardware cannot deal with the operation. The interrupt calls the software of the resource manager so that the resource manager may accomplish the operation. This allows those operations which are invoked very infrequently to be carried out in software, while those operations which are used frequently are implemented in hardware in order to speed up the system. In order to assist this operation, each input/output device on the device bus 34 also provides a signal to the puller circuit 40 to signal the puller circuit that no commands are to be transferred to the input/output device which has generated the interrupt until the interrupt servicing has been completed. This signal to the puller circuit is sent to a circuit 73 to disable the transmission of the device address on the bus 34.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An input/output device adapted to carry out commands irretrievably decoupled from a processor which generated the commands executing instructions of a program in a computer system comprising a first decoding circuit for decoding a range of addresses to which the decoupled commands are addressed, means for ascertaining whether the input/output device is able to respond to a command at an address decoded by the first decoding circuit, a circuit for storing the command and the address of a command transferred to the input/output device to which the input/output device is unable to respond, and means for generating an interrupt if the input/output device is unable to respond to a command.

2. An input/output device as claimed in claim 1 further comprising:

means for generating a signal in addition to the interrupt if the input/output device is unable to respond to a command, and a flow control circuit for receiving commands being transferred to the first decoding circuit, the flow control circuit responding to the signal generated when the input/output device is unable to respond to a command by halting the flow of commands to the input/output device.

3. An input/output device as claimed in claim 1 in which the means for ascertaining whether the input/output device is able to respond to a command at an address decoded by the first decoding circuit comprises a second decoding circuit for decoding addresses of all commands to which the input/output device is able to respond.

4. An input/output device adapted to be used in a computer system comprising a first decoding circuit for decoding a range of addresses, means for ascertaining whether the input/output device is able to respond to a command at an address decoded by the first decoding circuit comprising a second decoding circuit for decoding all addresses of commands to which the input/output device is able to respond, and a buffer storage circuit for receiving commands from the first decoding circuit and furnishing commands to the second decoding circuit, a circuit for storing the command and the address of a command transferred to the input/output device to which the input/output device is unable to respond, and means for generating an interrupt if the input/output device is unable to respond to a command.

5. A computer system comprising a central processing unit;

a system bus;

main memory; and an input/output device adapted to carry out commands irretrievably decoupled from the central processing unit which generated the commands executing instructions of a program including first decoding circuitry for decoding addresses of all decoupled commands to the input/output device, means for ascertaining whether the input/output device is able to respond to a command having an address decoded by the first decoding circuit, a circuit for storing the command and the address of a command transferred to the input/output device to which the input/output device is unable to respond, and means for generating an interrupt if the input/output device is unable to respond to a command.

6. A computer system as claimed in claim 5 in which the input/output device further comprises:

means for generating a signal in addition to the interrupt if the input/output device is unable to respond to a command, and a flow control circuit for receiving commands being transferred to the decoding circuit, the flow control circuit being adapted to respond to the signal generated when the input/output device is unable to respond to a command by halting the flow of commands to the input/output device.

7. A computer system as claimed in claim 5 in which the means for ascertaining whether the input/output device is able to respond to a command at an address decoded by the first decoding circuit comprises a second decoding circuit for decoding addresses of all commands to which the input/output device is able to respond.

8. A computer system comprising
a central processing unit;
a system bus;
main memory; and
an input/output device including
    first decoding circuitry for decoding the addresses of all commands to the input/output device,
    means for ascertaining whether the input/output device is able to respond to a command having an address decoded by the first decoding circuit comprising:
        a second decoding circuit for decoding addresses of all commands to which the input/output device is able to respond, and
        a buffer storage circuit for receiving commands from the first decoding circuit and furnishing commands to the second decoding circuit,
    a circuit for storing the command and the address of a command transferred to the input/output device to which the input/output device is unable to respond, and
    means for generating an interrupt if the input/output device is unable to respond to a command.

9. A method for controlling the flow of commands to an input/output device adapted to carry out commands irretrievably decoupled from a processor which generated the commands executing instructions of a program in a computer system comprising the steps of:
    transferring a decoupled command to the input/output device,
    ascertaining whether the input/output device is able to respond to the command,
    storing the command and the address of a command transferred to the input/output device to which the input/output device is unable to respond, and
    generating an interrupt if the input/output device is unable to respond to a command.

10. A method as claimed in claim 9 further comprising the step of interrupting a flow control circuit for receiving commands being transferred to the input/output device when the input/output device is unable to respond to a command by halting the flow of commands to the input/output device.

11. A method as claimed in claim 9 in which the step of ascertaining whether the input/output device is able to respond to a command comprises decoding addresses of all commands to which the input/output device is able to respond.

12. A method for controlling the flow of commands to an input/output device in a computer system comprising the steps of:
    transferring a command to the input/output device,
    ascertaining whether the input/output device is able to respond to the command comprising
        decoding addresses of all commands to which the input/output device is able to respond, and
        storing commands received from the flow control circuit in a buffer storage circuit and furnishing commands to the decoding circuit,
    storing the command and the address of a command transferred to the input/output device to which the input/output device is unable to respond, and
    generating an interrupt if the input/output device is unable to respond to a command.

\* \* \* \* \*